(12) United States Patent
Badafem et al.

(10) Patent No.: US 9,531,229 B2
(45) Date of Patent: Dec. 27, 2016

(54) BRUSHED ROTATORY DEVICE WITH COLLECTING STRUCTURE

(71) Applicant: Johnson Electric S.A., Murten (CH)

(72) Inventors: Awade Badafem, Shenzhen (CN); Min Li, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 455 days.

(21) Appl. No.: 14/062,164

(22) Filed: Oct. 24, 2013

(65) Prior Publication Data

US 2014/0111040 A1 Apr. 24, 2014

(30) Foreign Application Priority Data

Oct. 24, 2012 (CN) .......................... 2012 1 0409110

(51) Int. Cl.
*H02K 5/14* (2006.01)
*H02K 5/24* (2006.01)
*H02K 9/06* (2006.01)
*H02K 9/16* (2006.01)
*H02K 9/26* (2006.01)
*H02K 9/28* (2006.01)
*H02K 7/08* (2006.01)
*H02K 13/00* (2006.01)

(52) U.S. Cl.
CPC .............. *H02K 5/143* (2013.01); *H02K 5/148* (2013.01); *H02K 5/24* (2013.01); *H02K 9/26* (2013.01); *H02K 9/28* (2013.01); *H02K 7/083* (2013.01); *H02K 9/06* (2013.01); *H02K 9/16* (2013.01); *H02K 13/006* (2013.01)

(58) Field of Classification Search
CPC .......... H02K 5/14; H02K 5/143; H02K 5/145; H02K 5/146; H02K 5/148; H02K 5/20; H02K 5/28; H02K 9/28; H02K 5/24; H02K 9/00; H02K 9/02; H02K 9/04; H02K 9/06; H02K 9/08; H02K 9/10; H02K 9/12; H02K 9/14; H02K 9/16; H02K 13/0066
USPC ........... 310/52, 55, 58, 60 R, 61, 62, 63, 85, 310/86, 88, 148, 151, 173, 174, 175, 219, 310/227, 228, 407, 248
See application file for complete search history.

(56) References Cited

U.S. PATENT DOCUMENTS

| 3,919,574 | A | | 11/1975 | Schmuck | |
|---|---|---|---|---|---|
| 4,476,410 | A | * | 10/1984 | Wolcott | H01R 39/08 310/105 |
| 6,294,856 | B1 | * | 9/2001 | Ishida | H02K 9/28 310/232 |
| 6,417,595 | B1 | | 7/2002 | Wasson | |

(Continued)

*Primary Examiner* — John K Kim
*Assistant Examiner* — Minki Chang
(74) *Attorney, Agent, or Firm* — Muncy, Geissler, Olds & Lowe P.C.

(57) ABSTRACT

A brushed rotatory device (10) includes a stator, a rotor (14), an impeller (70), and a chamber (48) accommodating the commutator (16) and brushes (52) to contain debris from consumed brushes. The impeller causes air flow to dissipate heat generated by the rotatory device and may further carry the consumed brush debris away. The rotatory device includes flow channel(s) (72) which communicates with the impeller exhaust and accommodates absorbent or filtering materials (88) to trap the debris in the air flow. The commutation area may be double contained by using flange(s) (202) or wall(s) (42) to trap or confine a greater part of the debris in a localized region or to reduce noise from the rotatory device operations.

20 Claims, 8 Drawing Sheets

(56) References Cited

U.S. PATENT DOCUMENTS

| | | | |
|---|---|---|---|
| 6,703,754 B1 * | 3/2004 | Finkenbinder | F04D 25/06 310/227 |
| 2009/0189478 A1 * | 7/2009 | Wada | H02K 9/28 310/227 |

* cited by examiner

BRUSHED ROTATORY DEVICE WITH COLLECTING STRUCTURE

CROSS REFERENCE TO RELATED APPLICATION(S)

This application claims the benefit of Chinese patent application serial no. 201210409110.4 having a filing date of Oct. 24, 2012. The content of the aforementioned patent application is hereby incorporated by reference in its entirety for all purposes.

BACKGROUND

Conventional brushed rotatory devices suffer the disadvantages of excessive noise due to the interaction between the brushes and the commutator. In addition, the debris generated by wear and tear of the brushes due to the interaction between the brushes and the commutator may also deposit in or migrate to undesired areas to cause such problems as contamination and short circuit. Conventional brushed rotatory devices often use impellers or fans to dissipate the heat generated during the operations of the rotatory devices via forced convection. The use of impellers or fans may nonetheless exacerbate the issues of having debris in undesired areas because the forced convection caused by the air flow from the impellers or fans may carry or cause such debris to migrate to such undesired areas.

For example, FIG. 7 illustrates a schematic diagram of the air flow paths in a conventional brushed motor. The brushed motor includes a stator 1, a rotor 2, and an impeller or fan 3. The brushed motor further includes an end cap 4 that also covers or houses the impeller or fan 3. The impeller or fan 3 intakes air from the bottom of the brushed motor through the area near the rotor 2 and the magnet 5 and generates air flow that may carry or cause debris from spent brushes due to commutation between the commutator 6 and brushes (not shown in FIG. 7) to migrate to undesired areas such as the area in which electronic components 7 are located. The deposit of the debris in such an area near the electronic components 7 may cause short circuits due to the electrical conductivity of the debris. In addition, the debris may be inadvertently vented to the atmosphere via, for example, one or more openings 8 in a part of the brushed motor.

Therefore, there exists a need for an improved rotatory device that may reduce the noise level during operation. There also exists a need for an improved rotatory device that may reduce or eliminate the possibility of having debris generated by the interaction between brushes and the commutator contaminating undesired areas.

SUMMARY OF THE INVENTION

Some embodiments are directed to a brushed rotatory device that includes, in addition to components such as a rotor, a stator, a shaft, an end cap, etc., various other components or structures to control the migration of debris generated by the commutation between brushes and the commutator and/or to reduce the noise level of the operations of the rotatory device. Exemplary rotatory devices include motors, generators, alternators, and dynamos in various embodiments. In some of these embodiments, the rotatory device may also include a chamber that accommodates or houses at least a part of the commutator and brushes to prevent at least a part of debris generated from spent brushes due to the interaction between the brushes and the commutator from escaping or migrating into undesired areas such as the space outside the rotatory device to cause contamination or the areas where electrical or electronic components are disposed to cause short circuit.

The impeller assembly intakes air from, for example, one or more openings on or near one end of the rotatory device to dissipate heat generated by the operations of the rotatory device and may further carry or agitate the debris generated by the commutation between the brushes and the commutator in the air flow. The rotatory device includes one or more flow channels which communicate with the exhaust of the impeller. At least a part of the one or more flow channels may further accommodate some absorbent or filtering materials to trap or filter the debris that is agitated or carried in the air flow. The area where commutation and thus debris generation occurs may be contained or enclosed at least in part by using the first form of enclosure or containment structures to control where the generated debris may migrate in some embodiments.

The area where commutation and thus debris generation occurs may further be double contained or enclosed, at least in part, by using the second form of enclosure or containment structures in some of the embodiments. In some of these embodiments, the first form of enclosure or containment structures may include separate components or structures or may include integrally formed or separately attached to some existing components or structures in the rotatory device such as a bearing seat for rotatably supporting the shaft of the rotatory device. In some embodiments, the second form of enclosure or containment structures include separate components or structures or may include integrally formed or separately attached to some existing components or structures in the rotatory device such as the flange(s) or wall(s) to further ensure that a greater part of the debris may be confined in a localized region.

The second form of enclosure or containment structures or the first form of enclosure or containment structures may also serve to confine the noise in a localized area to reduce the noise level due to the operations of the rotatory device. The absorbent or filtering materials or components may be attached to at least a part of the one or more flow channels before the air flow caused by the impeller finally exits the rotatory device to further absorb or filter out the debris generated by the interaction between the brushes and the commutator. Some embodiments may further protect one or more electrical or electronic components of the rotatory device from the generated debris by disposing the one or more electrical or electronic components in an enclosure attached to the external surface of the housing of the rotatory device.

Some first embodiments are directed to a brushed rotatory device that comprises a rotor including a shaft, a rotor core and a commutator attached to the shaft, a housing assembly surrounding the rotor, an impeller assembly mechanically coupled to the shaft of the rotor and adjacent to the commutator and remote from the rotor core, an end cap assembly attached to a first end of the housing assembly adjacent the commutator and including a base having at least one opening formed therein, a sidewall extending from the base around a periphery of the at least one opening in an axial direction of the shaft of the rotor and surrounding the commutator of the rotor, and a plurality of brush holders attached to the base, and a plurality of brushes disposed in the plurality of brush holders of the end cap assembly and in sliding contact with the commutator of the rotor.

In some of these first embodiments, the rotatory device may further comprise a flow channel having a first end communicating with an exhaust of the impeller assembly. In some of the immediately preceding embodiments, the rotatory device may also include an absorbent or filtering component disposed along at least a part of the flow channel. The rotatory device may also optionally include an end cap cover attached to a first end of the end cap assembly and including a flat portion in physical contact with two sidewalls on both sides of the flow channel. In addition or in the alternative, the impeller fluidly communicates with an area surrounding the commutator only through the flow channel. The impeller may further fluidly communicate with an area surrounding the commutator inside the housing assembly only through the at least one opening in the base of the end cap assembly. The end cap assembly may also include one or more exhaust ports disposed at a second end of the flow channel and downstream over at least a portion of the absorbent or filtering component. Moreover, the flow channel may be optionally arranged downstream over at least a portion of the absorbent or filtering component. The flow channel may also be optionally arranged downstream of the impeller assembly along a circumferential direction of the end cap assembly in some exemplary implementations. The flow channel may be arranged downstream of the impeller assembly along a circumferential direction of the end cap assembly. In addition or in the alternative, the rotatory device may further include an end cap cover attached to a first end of the end cap assembly and including a flat portion in contact with two sidewalls on both sides of the flow channel.

The brushed rotatory device may also include a first bearing seat accommodating a first bearing seat accommodating a first bearing supporting the shaft of the rotatory device and including a seat flange extending along the axial direction of the shaft toward the commutator to cover at least a portion of a commutation area. The rotatory may further optionally include a first chamber having a first chamber body and disposed within the housing assembly, covering at least a part of the commutation area, and including a boundary comprising at least the seat flange of the first bearing seat. In some of the first embodiments, the impeller assembly of the brushed rotatory device may include an intake disposed on one end of the impeller assembly closer to the commutator in the housing assembly and a plurality of blades defining a plurality of air passageways with each air passageway between two immediately neighboring blades of the plurality of blades, wherein the plurality of air passageways also function as one or more exhausts for the impeller assembly. Each of the multiple air passageways may be disposed between two immediately neighboring blades of the multiple blades of the impeller assembly. In some embodiments, the rotatory device may also optionally include a second chamber including a chamber body having one or more partitions and attached to the housing assembly and one or more electrical components electrically connected to the plurality of brushes and disposed inside at least some of the one or more partitions of the second chamber.

The second chamber may be disposed on an internal side of the housing assembly in some of these embodiments. The rotatory device may further optionally include a third chamber disposed inside the housing assembly and comprising a third chamber opening into which an intake of the impeller assembly is situated, wherein a boundary of the third chamber is defined by at least a part of the impeller assembly and a flange extending from the end cap assembly, and the third chamber includes a third chamber body that comprises the flange and encloses at least a part of a commutation area. In addition or in the alternative, the rotatory device may further include a field winding wound on the rotor and electrically connected to the commutator, a stator including multiple magnets and enclosing at least a portion of the rotor, and a magnetic flux ring enclosing the stator. The rotatory device may also include a frame including one or more openings and attached to a second end opposite to the first end of the housing assembly, wherein the one or more openings communicate with an air intake of the impeller assembly inside the housing assembly.

An exemplary impeller assembly may include a centrifugal type impeller. This exemplary impeller further includes a plurality of blades and an impeller cover. The impeller cover may be disposed on one side of the plurality of blades, adjacent to the rotor core of the rotor and having a curved portion forming an air intake for the impeller assembly, wherein at least a portion of the air intake of the impeller cover is disposed in the at least one opening in the base of the end cap assembly in some embodiments. An impeller cover may include a flat cover portion and a curved cover portion disposed on one side of the multiple blades of the impeller assembly closer to the rotor core in some embodiments. The curved portion may form a part of an air intake for the impeller assembly, and at least a portion of the air intake of the impeller cover may be disposed in an end cap opening on the end cap in some of these embodiments. An exemplary impeller may further optionally include a second impeller cover. The second impeller cover may be disposed on an opposite side of the multiple blades of the impeller assembly, and the opposite side of the multiple blades is remote from the rotor core than the one side on which the flat cover portion and the curved cover portion are disposed. In some of these first embodiments, the brushed rotatory device comprises a high-voltage direct-current brushed motor.

Some second embodiments are directed at a method of using a rotatory device. The method may include the act of identifying a rotatory device including an end cap removably attached to a housing assembly of the rotatory device on a first end of rotatory device, wherein the housing assembly encloses a commutation area in which a commutator and multiple brushes are disposed, the act of preventing debris generated by interactions between the multiple brushes and the commutator from migrating into one or more undesired areas, the act of reducing a noise level of operations of the rotatory device by using a second chamber that includes a second chamber body enclosing the at least a part of a first chamber within the housing assembly, and the act of reducing heat generated by the operations of the rotatory device by guiding air flow past at least some internal components within the housing assembly and an impeller assembly to a flow channel disposed on the end cap and communicating with an exhaust on the end cap.

When the rotatory device is used to prevent the debris from migrating into one or more undesired areas, the method may further include the act of enclosing at least a part of the commutation area within the housing assembly with the first chamber, wherein the first chamber is defined by at least a part of a bearing seat. In addition or in the alternative, the act of preventing the debris from migrating into the one or more undesired areas may include the act of enclosing at least a part of the first chamber within the housing assembly with the second chamber, wherein the second chamber is defined by at least a flange extending from the end cap along an axial direction of a shaft of the rotatory device. The act of preventing the debris from migrating into the one or more undesired areas may optionally include the act of controlling air flow by using at least an absorbent or filtering component overlaid on one or more surfaces of a flow channel and an impeller assembly comprising multiple blades, wherein a first end of the flow channel communicates with multiple air passageways of the impeller assembly, and a second end of the flow channel communicates with an exhaust on the end cap. The act of preventing the debris from migrating into the one or more undesired areas may optionally include the act of disposing one or more electrical components in a third chamber attached to an external surface of the housing assembly, wherein the third chamber includes one or more partitions.

The method may also optionally include the act of controlling air flow by using at least an absorbent or filtering component overlaid on one or more surfaces of a flow channel and an impeller assembly comprising multiple blades to prevent the debris from migrating into one or more undesired areas. In this case, the first end of the flow channel communicates with multiple air passageways of the impeller assembly, and a second end of the flow channel communicates with an exhaust on the end cap. In some of the second embodiments, the method may further include the act of disposing one or more electrical components in a third chamber attached to an external surface of the housing assembly, wherein the third chamber includes one or more partitions to prevent the debris from migrating into one or more undesired areas. A high-voltage direct current brushed motor may be used in some of the embodiments described for the method.

More details about the rotatory device are described in the Detailed Description section with reference to FIGS. 1-8A-C as provided below.

BRIEF DESCRIPTION OF THE FIGURES

The drawings illustrate the design and utility of embodiments, in which similar elements are referred to by common reference numerals. These drawings are not necessarily drawn to scale. In order to better appreciate how the above-recited, advantages, and objects are obtained, a more particular description of the embodiments will be rendered which are illustrated in the accompanying drawings. These drawings depict only exemplary embodiments and are not therefore to be considered limiting of the scope of the claims.

DETAILED DESCRIPTION

Figure 1:
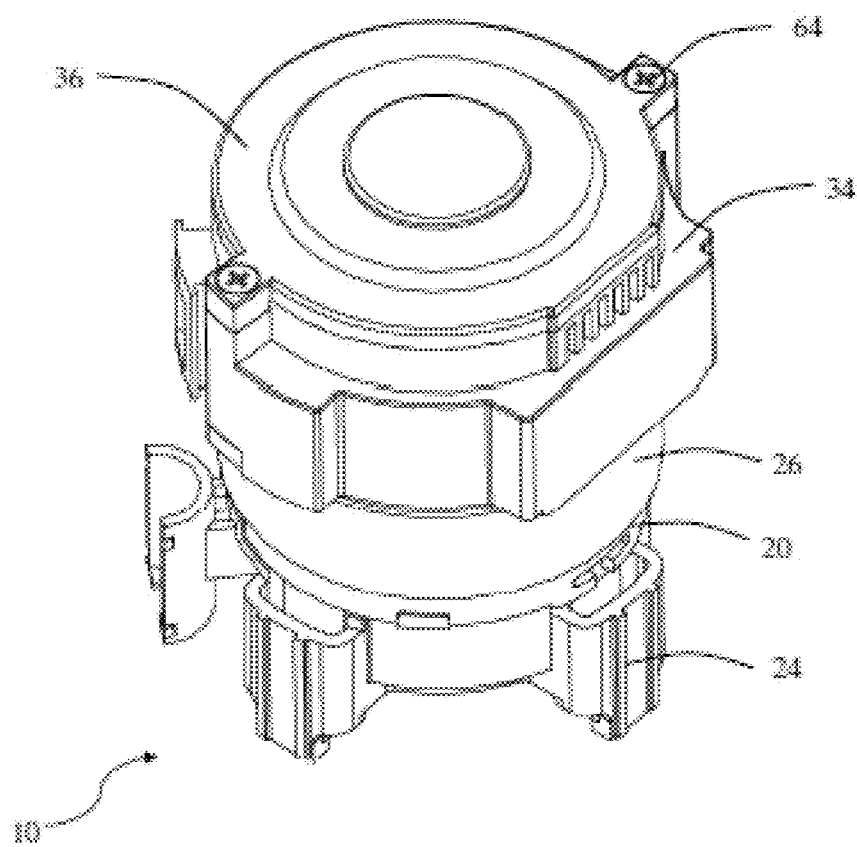
FIG. 1 illustrates a perspective view of an exemplary rotatory device in some embodiments.

Various features are described hereinafter with reference to the figures. It shall be noted that the figures are not necessarily drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Figure 2:
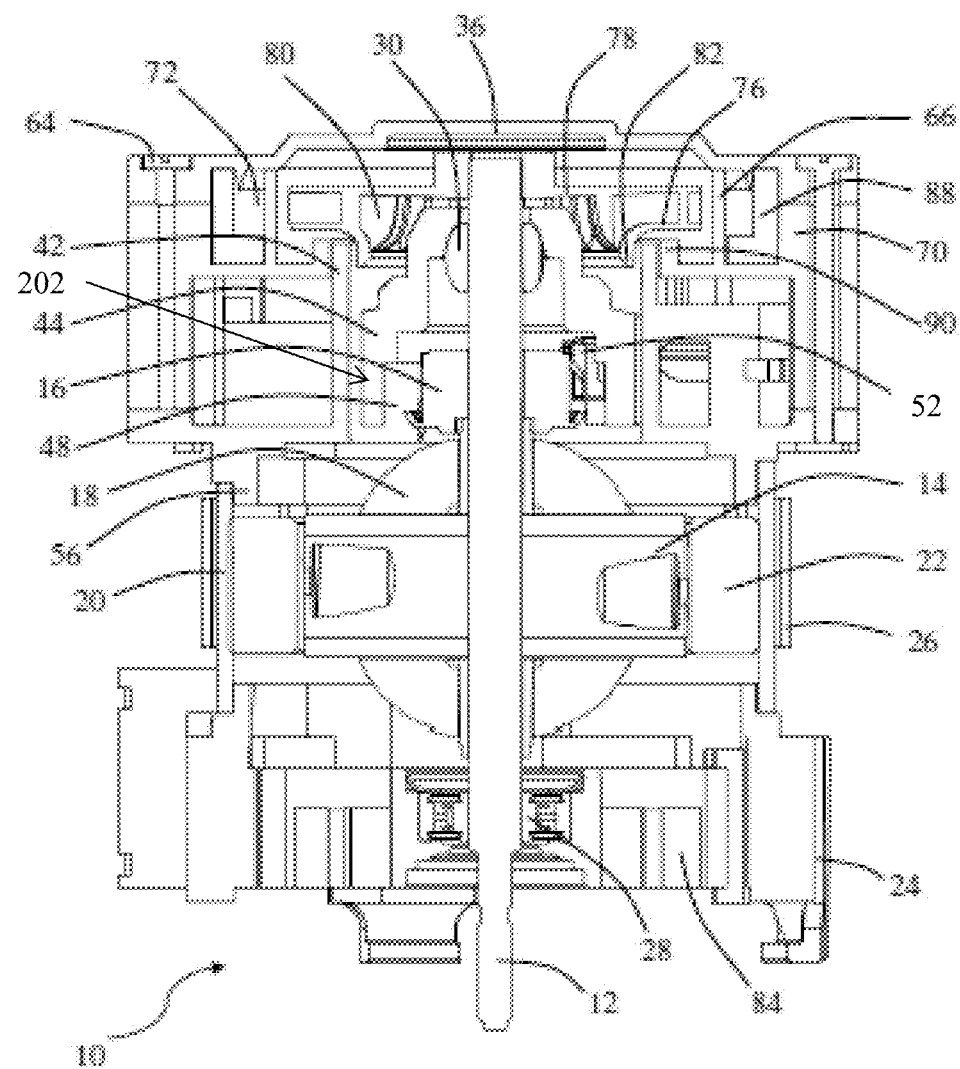
FIG. 2 illustrates a cross-section view of the exemplary rotatory device illustrated in FIG. 1 in some embodiments.

FIGS. 1-2 respectively illustrate a perspective view and a cross-sectional view of an exemplary rotatory device 10 in some embodiments. The exemplary rotatory device 10 including multiple brushes may include a motor, a generator, a dynamo, or an alternator in these embodiments. For the ease of illustration and explanation, the following description of various figures including that of FIG. 1 refers to a brushed motor. Nonetheless, various aspects described herein apply with full and equal effects, and that the reference to a brushed motor is not intended to and shall not be interpreted as to limit the scope of various embodiments described herein, unless otherwise specifically recited or claimed.

In these embodiments illustrated in FIGS. 1-2, the rotatory device 10 includes a housing 20, an end shield, end bracket, or end bell (collectively an end cap hereinafter) attached to one end of the housing 20 and including at least a first cover 34 attached to the one end of the housing 20 and a second cover 36 attached to the first cover 34 to enclose the other end of the rotatory device 10 with the use of, for example, a fasteners 64, a base frame 24 attached to the other end of the housing 20, and a magnetic flux ring 26 attached to the exterior of the housing 20. It shall be noted that each of various components or parts described herein may constitute a single, inseparable component or part or a separately assembled assembly, unless otherwise specifically recited or described.

The base frame 24 includes an opening for a bearing 28 to accommodate and allow a shaft 12 of the rotatory device 10 to pass through to transfer mechanical energy into or out of the exemplary rotatory device 10 as illustrated in FIG. 2.

The shaft 12 is also rotatably supported by another bearing or sleeve 30 that is disposed near the second cover 36 of the exemplary rotatory device 10. In some of the illustrated embodiments, the base frame 24 may include one or more openings to allow air to flow into the exemplary rotatory device 10 to, for example, provide cooling to one or more components of the exemplary rotatory device 10 or to carry the debris or particles (hereinafter debris collectively) generated by the interaction between the brushes 52 and the commutation device 16 (e.g., a commutator).

A brush may be made of a substance including carbon, graphite, metal fibers, copper, etc. co-sintered with a binder material that either burns off or becomes carbonized during the sintering process. A brush contacts the commutator (or multiple commutator segments) during the operation of a rotatory device. Therefore, the contact between a brush and the commutator and the rotation or spinning of the rotatory device usually causes the brush to wear out over time. The spent brush material, usually in the form of debris or particles of various sizes, may deposit or migrate into some undesired areas.

In some of these embodiments, the air flow entering from the one or more openings 84 on the base frame 24 flows through the interior of and subsequently exits the exemplary rotatory device 10 in a controlled manner that will be described in greater details in subsequent paragraphs. The magnetic flux ring 26 may be attached to the exterior of the housing 20 to reduce the magnetic reluctance of the magnetic field defined by, for example, permanent magnets, field windings or field coils, or both for the operations of the rotatory device 10. The housing 20 may be made of materials that have high magnetic susceptibility in some embodiments or high magnetic permeability in some other embodiments. The housing 20 may accommodate one or more permanent magnets 22 disposed along the interior walls of the housing 20 as illustrated in FIG. 2 in some embodiments.

The exemplary rotatory device 10 may also include a rotor 14, which includes field windings and is fixedly attached to the shaft 12, and a commutation device 16 in some embodiments. The rotor 14 may include multiple laminas that are stacked together along the axial direction of the shaft 12 to form a stack of laminas in some of these embodiments. The rotor 14 may include field windings 18 in these embodiments. The exemplary rotatory device 10 may also include a stator that includes multiple permanent magnets 22 attached to the interior wall of the housing 20. In some of these embodiments, the permanent magnets 22 and the rotor 14 may be configured and disposed inside the housing 20 such that there is a constant or variable spacing between the external diameter or boundary of the rotor 14 and the internal diameter or boundary of the one or more permanent magnets 22. In addition to allowing the rotor to rotate or spin in the stator, the spacing between the rotor and the stator may be configured to, for example, reduce the effects of saturation and thus cause the magnetic field therein to store more energy before reaching the saturation limit of a given motor design.

In the embodiments illustrated in FIGS. 1-2, the exemplary rotatory device 10 may include one or more field windings, one or more field coils, or one or more electromagnets 18 (collectively field windings hereinafter) wound directly or indirectly on the shaft 12 or the rotor 14 in a position that corresponds to the magnets 22 in the stator to form a continuous loop of magnetic loop or magnetic circuit from the stator through the rotor 14 and back through the stator. In these illustrated embodiments, the field windings 18 are wound on the rotor 14 or the shaft 12. In the illustrated embodiments, the magnetic flux ring 26 substantially encloses the permanent magnets 22 in the stator, and the permanent magnets 22 are also arranged in such a manner to correspond to the field windings 18 to form the magnetic circuit for the exemplary rotatory device 10.

It shall be noted that the term "substantially" is used herein to refer to a feature that is intended or designed to be of certain characteristic such as a magnetic flux ring substantially enclosing the permanent magnets. Nonetheless, the manufacturing or design slacks, manufacturing tolerances, material movement or deformation due to various physical processes (e.g., material movement or deformation due to heat generated during the manufacturing process), or the normal wear and tear may cause the feature to deviate from the intended profile or dimensions.

For example, the magnetic flux ring 26 may be designed to enclose the permanent magnets 22, but the manufacturing or design slacks, manufacturing tolerances, material movement or deformation due to various physical processes, or the normal wear and tear may nevertheless cause the produced profile of the magnetic flux ring 26 to deviate from the intended profile as designed. Therefore, the magnetic flux ring 26 in this example thus "substantially" encloses the permanent magnets 22 to accommodate such deviations from theoretical or absolute straightness. In addition, the magnetic flux ring 26 may be designed to include one or more openings or even multiple pieces which, when assembled together with or without some gaps between two immediately neighboring pieces, jointly form the magnetic flux ring 26 as a design choice. In these examples, the magnetic flux ring 26 nonetheless substantially enclosed the permanent magnets 22, despite the presence of one or more openings or one or more gaps due to a design choice.

The exemplary rotatory device 10 also includes multiple brushes 52 and a commutator 16 that has multiple commutator segments to contact the multiple brushes 52 for commutation in order to convert electrical energy into mechanical energy or vice versa to conduct the electric form of energy into or out of the exemplary rotatory device 10. In these embodiments illustrated in FIG. 2, the commutator 16 may be fixedly attached to the shaft 12 in a position near the rotor 14 and is electrically connected to the field windings 18. The exemplary rotatory device 10 may also include a bearing seat 44 that accommodates a bearing 30 that is disposed near the second cover 36 of the exemplary rotatory device 10 in some embodiments.

In some of these embodiments, the bearing 30 seated in the bearing seat 44 may be rotatably supported on the shaft 12, and the bearing seat 44 may be designed or configured in such a way to not only accommodate the bearing 30 but also include an integrally formed or separately attached extended flange 202 that extends along the axial direction of the shaft 12 to form a commutation accommodation chamber 48 that covers or shields at least a part of the commutator 16, the multiple brushes 52, or both in some embodiments. The commutation accommodation chamber 48 may be used to not only to accommodate the commutator 16, the multiple brushes 52, or both but also to contain, at least in part, the debris generated by the interaction between the multiple brushes 52 and the commutator 16.

Although the commutation accommodation chamber 48 may not necessarily have all fully enclosed chamber walls to form a fully enclosed space, it may nonetheless include one or more sections of chamber walls in order to contain the debris, especially in the presence of an impeller assembly 70 that causes air flows through various interior parts of the exemplary rotatory device 10 in some embodiments. In these embodiments, the commutation accommodation chamber 48 may effectively reduce or even prevent air flows from entering the area in which commutation occurs. The commutation accommodation chamber 48 may also prevent the air flow from carrying the debris away or causing or aiding the debris to migrate or spread (hereinafter migrate collectively) to undesired areas within the exemplary rotatory device 10. Such undesired or uncontrolled migration of debris or particles may cause issues such as short in electrical or electronic circuitry by the deposit of the debris. Such undesired or uncontrolled migration of debris or particles into other undesired areas (e.g., the environment outside the exemplary rotatory device 10 to) may cause, for example, contamination concerns. It shall be noted that various components or structures (e.g., the bearing seat 44, the cylindrical sidewall 42, etc.) are described herein as to "contain" the debris or particles generated by the interaction between the brushes 52 and the commutator 16. Nonetheless, the use of the term "contain" may or may not necessarily mean that the generated debris will be completely or fully contained or enclosed within the space defined by these various components or structures. It shall be noted that unless otherwise specifically recited or claimed, the term chamber includes a chamber body with one or more sections of walls. Nonetheless, a chamber described herein may or may not include all the sections of walls to form a fully enclosed space. For example, a first chamber may have one or more sections of sidewalls with the top or bottom walls. As another example, a second chamber may have the bottom wall and one or more sections of sidewalls but without the top wall.

In some of these embodiments, the impeller assembly 70 may comprise a centrifugal type impeller where the impeller acts as a compressor to compress the air flow through the impeller assembly 70. In some embodiments, some or all of the various components or structures may trap or capture at least a part of the generated debris or particles within the space defined by these various components or structures. In some other embodiments, some or all of these various components or structures may also effectively lengthen the migration paths and introduce one or more bends along one or more migration paths so as to prevent at least some of the generated debris from reaching certain undesired areas. In yet some other embodiments, some or all of these various components or structures serve to both trap and increase the migration path(s) of at least some of the generated debris. It shall also be noted that the use of the word "contain" may or may not necessarily indicate that the various components or structures (e.g., the bearing seat 44, the cylindrical sidewall 42, etc.) described herein form a fully enclosed space to keep the generated debris within its confines.

In some embodiments, the first form of enclosure or containment structures, the second form of enclosure or containment structures, or the accommodation chambers may be designed based at least in part upon one or more criteria including, for example but not limited to, the cooling requirements, cost requirements for the rotatory device, the designs of one or more other neighboring components or features in the rotatory device, reliability or functional requirements of the rotatory device, service requirements, etc. For example, a designer may weigh the cost of more complex designs for fully or nearly fully enclosing the commutation area against benefit of having more complex designs for fully or nearly fully enclosing the commutation area in terms of reliability and/or the service requirements (e.g., to replace the brushes after a certain period of time) to determine how well the commutation area is to be contained.

In this example, the designer may find that an open enclosure or accommodation chamber may meet all or most of the requirements although more debris may find its way to some undesired area because the accumulated debris in these undesired areas may not be of some sufficient amount so as to cause issues by the time the rotatory device is due for service. The remaining portion of FIG. 2 such as the end cap base 32, the first cover 34 attached to the end cap base 32, and the second cover 36 will be described below with reference to FIG. 2 and additional reference to FIGS. 3-4.

Figure 3:
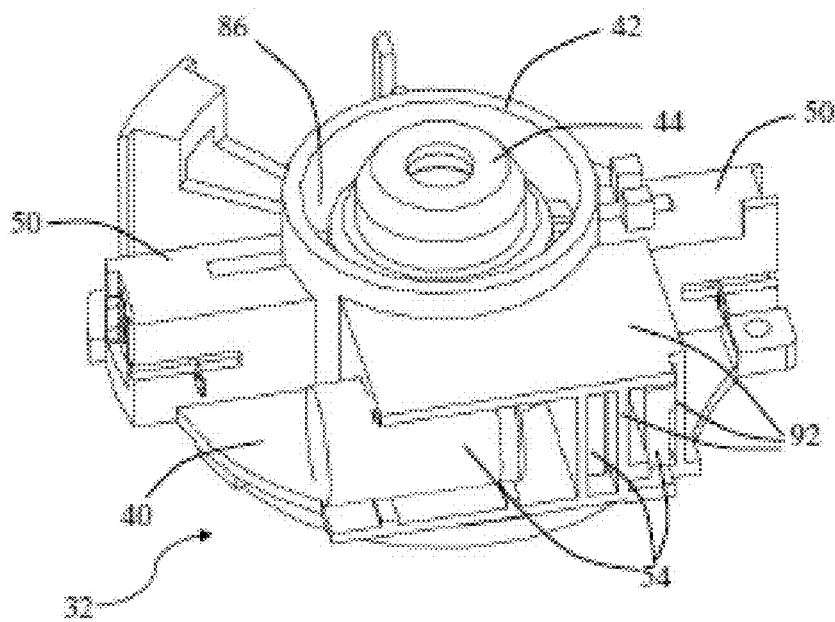
FIG. 3 illustrates a perspective view of an exemplary end cap assembly of an exemplary rotatory device in some embodiments.
Figure 4:
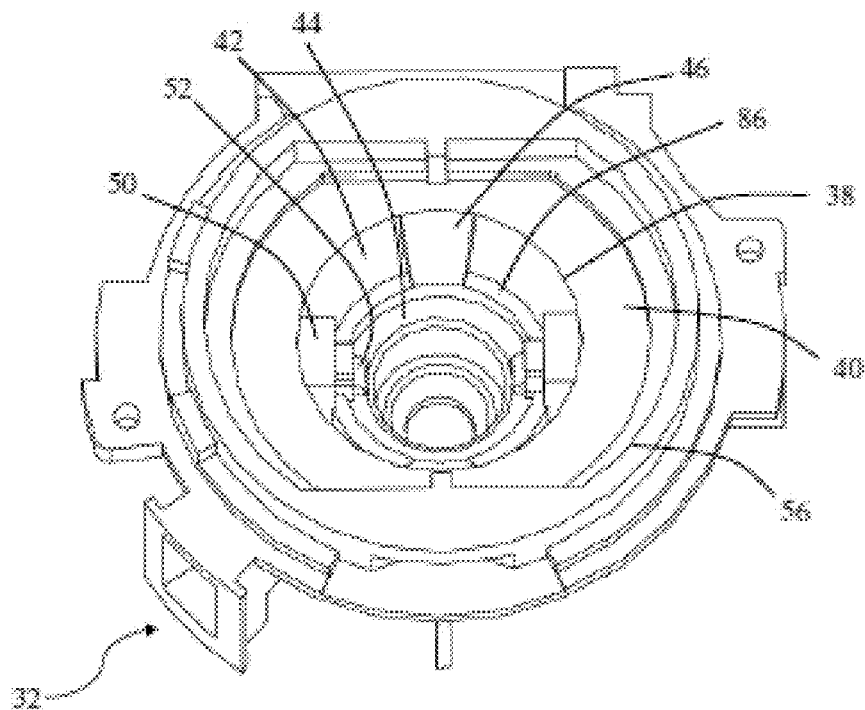
FIG. 4 illustrates another perspective view of the exemplary end cap assembly of an exemplary rotatory device illustrated in FIG. 4 in some embodiments.

FIG. 3 illustrates a perspective view of an exemplary end cap base 32 of the exemplary rotatory device 10 in some embodiments. FIG. 4 illustrates another perspective view of the exemplary end cap base 32 illustrated in FIG. 3 of the exemplary rotatory device 10 in some embodiments. The exemplary rotatory device 10 may also include the end cap base 32 that includes a first base 40 defining a first opening 38, multiple brush holders 50 attached directly or indirectly to the first base 40, a cylindrical sidewall 42 that extends from the periphery of the first opening 38 along the axial direction of the shaft 12 and accommodates a bearing seat 44 for the bearing 30 (see FIG. 1) in some embodiments.

In some of these embodiments, the cylindrical sidewall 42 need not have a perfectly cylindrical form. In the embodiments where the exemplary rotatory device 10 includes the bearing seat 44 having the extended flange 202, the cylindrical sidewall 42 may serve as a secondary containment to further ensure that at least a greater part of the debris generated by the commutation between the multiple brushes 52 and the commutator 16 may be localized or further confined within a controlled space, rather than possibly migrating to some undesired areas. In these embodiments, the bearing seat 44 may serve as the containment, and the cylindrical sidewall 42 may serve as the secondary containment for the debris generated by the interactions between the multiple brushes 52 and the commutator 16. For example, the internal surface, the external surface, or both the internal and the external surfaces of the cylindrical sidewall 42 need not be perfectly cylindrical in some embodiments. Rather, the external surface, or both the internal and the external surfaces of the cylindrical sidewall 42 may include one or more other features such as openings, extrusions, etc. that cause these surfaces to deviate from perfect cylindrical shapes.

Each brush holder 50 of the multiple brush holders 50 accommodates a brush 52 and may be attached to the first base 40 or the cylindrical sidewall 42 or both. The cylindrical sidewall 42 substantially housing the bearing seat 44 may have for example, multiple stiffeners 46 to increase the structural strength or to reduce vibration of the exemplary rotatory device 10 during operations. In the embodiments illustrated in FIG. 4, the end cap base 32 includes at least one stiffener 46 that extends in the axial direction of the shaft 12 and is either an integrally formed on or separately attached to the internal diameter of the cylindrical sidewall 42. Nonetheless, other numbers or forms of stiffeners 46 may also be used, and the illustration in these figures shall not be interpreted as limiting the scope of the claims or the scope of other embodiments.

In addition or in the alternative, a brush 52 may be slidably installed onto its corresponding brush holder 50. A brush 52 may also be spring-loaded to provide sufficient contact pressure between the brush 52 and the commutator 16 to ensure proper electrical contact therebetween in some embodiments. The end cap base 32 may also include one or more electrical connectors (not shown) to connect, for example, the multiple brushes 52 or one or more electrical or electronic components 54 (e.g., electromagnetic filter(s), protection circuitry, rectifier(s), capacitor(s), inverter(s), etc.) to external sources or components (not shown). For example, the one or more electrical connectors may connect an exemplary brushed motor to an external alternating circuit power source to convert the alternating current to high-voltage direct current that flows through the multiple brushes 52 and commutator 16 to provide electrical power to the field windings 18 for the operations of the high-voltage direct current brushed motor. In some embodiments, the high-voltage direct current motor may operate within the range of 50 Volts DC to 400 Volts DC. It shall be noted that other types of electrical connections are also possible, and thus the illustration in these figures and description thereof shall not be considered as limiting the scope of the claims or the scope of other embodiments, unless otherwise specifically recited or claimed.

In some embodiments illustrated in FIGS. 2-4, the exemplary rotatory device 10 may further include an impeller assembly 70 attached to the shaft 12. In some of these embodiments, the first base 40 may include a flange 56 that extends along the axial direction of the shaft 12 for a distance to maintain a sufficiently small gap between the end of the flange 56 and the closest point on the impeller assembly 70. For example, the flange 56 may be designed to include a height that, when the end cap base 32 is installed on the exemplary rotatory device 10, an allowable minimum spacing including the manufacturing tolerance(s) or slacks is maintained between the end of the flange 56 and the corresponding portion on the impeller cover 76 of the impeller assembly 70. In addition or in the alternative, the opening defined by flange 56 may be configured in such a way to maintain a small gap between the internal surface profile of the flange 56 and the external surface of the bearing seat 44 in some embodiments.

In some of these embodiments where the height or the internal surface profile of flange 56 is thus configured, the flange 56 on the first base 40 may further serve to contain the debris generated by the interaction between the multiple brushes 52 and the commutator 16 to prevent or reduce the probability of such debris from migrating to undesired areas as described above. Another advantage of sufficiently closing the gap between the end of the cylindrical wall 42 and the impeller cover 76 is that the space in which commutation occurs will be further enclosed or isolated so that the overall noise level due to the operation of the exemplary rotatory device may be reduced. In the embodiments illustrated in FIG. 4, the first base 40 mates with at least a part of the internal surface of the housing 20 to secure the first base in the exemplary rotatory device 10.

In the embodiments illustrated in FIG. 3, the end cap base 32 also defines an area 86 which accommodates at least a part of the impeller cover 76. FIG. 3 also illustrates that one or more chambers formed by multiple partitioning walls 92 may be attached to or integrally formed on the exterior surface of the sidewall 42 of the end cap base 32 to accommodate various electrical or electronic components (e.g., the electrical or electronic components 54), where each partitioning wall of the multiple partitioning walls 92 may be further attached, with or without intervening part(s) therebetween, to the interior surface of the one or more sidewall portions 62 of the first cover 34 in some embodiments.

Figure 5:
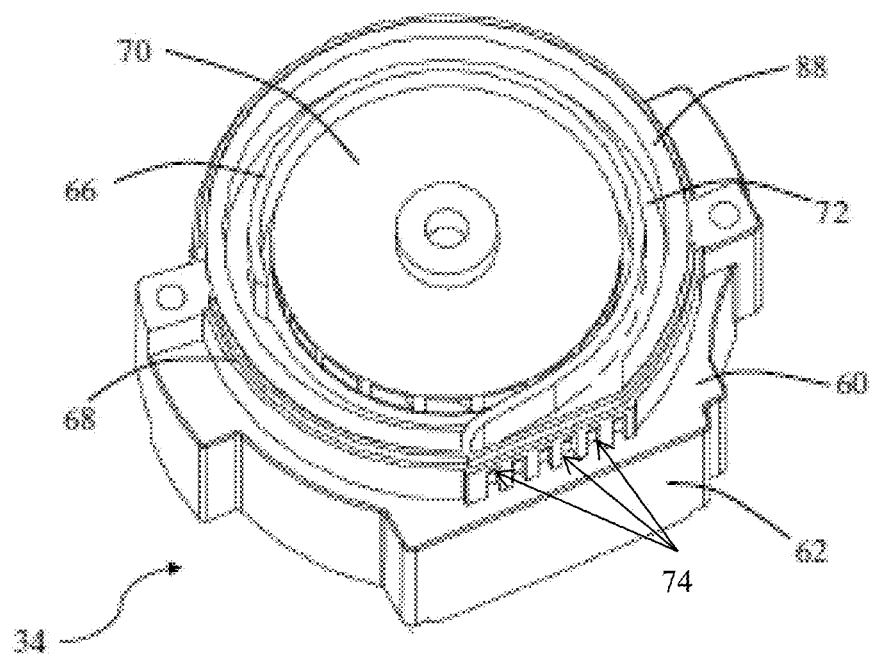
FIG. 5 illustrates a perspective view of an exemplary first cover and an exemplary impeller assembly attached thereto of an exemplary rotatory device in some embodiments.
Figure 6:
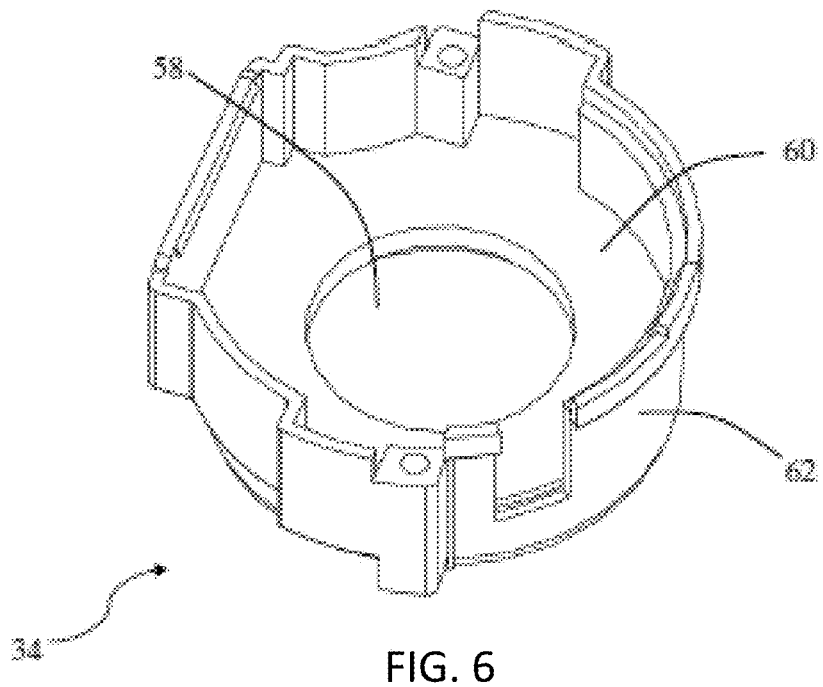
FIG. 6 illustrates another perspective view of the exemplary first cover without the exemplary impeller assembly attached thereto of an exemplary rotatory device illustrated in FIG. 5 in some embodiments.
Figure 7:
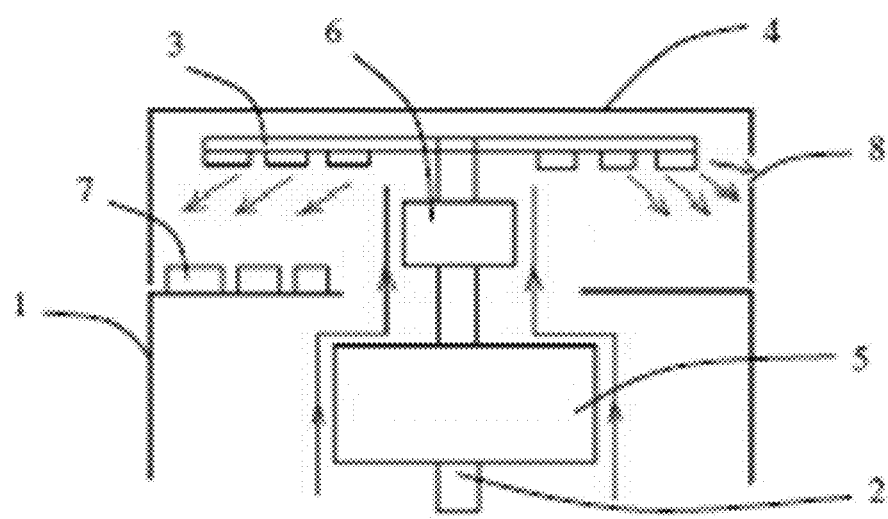
FIG. 7 illustrates a schematic flow diagram of the air flow paths in a conventional brushed motor.

FIG. 5 illustrates a perspective view of the first cover 34 of an exemplary rotatory device 10 in some embodiments. FIG. 6 illustrates another perspective view of the first cover 34 of an exemplary rotatory device 10 in some embodiments. In the illustrated embodiments, the first cover 34 may include a second base 60 and a sidewall 62 that extends in the axial direction of the shaft 12 towards the commutator 16 along the external boundary of the second base 60 in some embodiments. The first cover 34 may also include a continuous flow channel 72 that is defined by the second based 60, an inner flange 66, and an outer flange 68 in some embodiments. In some of these embodiments, the inner flange 66 and the outer flange 68 include continuous surface profiles to provide a channel to guide the air flow while reducing or eliminating internal corners in order to reduce the possibility of having the debris deposited in the internal corners along the flow channel 72.

The flow channel 72 may be configured in such a way to accommodate one or more absorbent or filtering components 88 to absorb or trap the debris from the wear and tear of the brushes during the operation of the rotatory device 10. In the embodiments illustrated in FIG. 5, the one or more absorbent or filtering components 88 are disposed along the internal surface of the outer flange 68 although other placement or disposition may also be adopted. The inner flange 66 may be configured in such a way that the end of the inner flange 66 is situated at the same height or above the highest point of the multiple blades of the impeller assembly 70 such that the air flow existing the impeller assembly 70 may be at least somewhat confined by the inner flange 66 in some embodiments.

The height of the outer flange 68 may be the same or different from that of the inner flange 66 and may be determined based on a design choice. The one or more absorbent or filtering materials 88 may be configured and disposed along at least a part of the flow channel 72 such that the air flow, which may carry the debris generated from commutation, are in direct contact with the one or more absorbent or filtering materials 88 before the air flow exits the flow channel 72 into the atmosphere through the one or more vents or slits 74 (also see FIGS. 8A and 8C). The first cover 34 may also define a second opening 58 that accommodates at least a part of the impeller cover 76 which may include a flat portion 804B and a curved portion 802B as illustrated in FIG. 8B. In some other embodiments, the impeller assembly 70 may comprise an open impeller that has no cover. In these embodiments, the impeller assembly 70 may operate at higher speeds due to the absence of the cover. The impeller assembly 70 in these embodiments may have fewer stages than impeller assemblies 70 having the impeller cover 76.

In these embodiments illustrated in FIG. 5, the flow channel 72 communicates with the air passageways (e.g., 808B in FIG. 8B) of the impeller assembly 70 through an opening in the inner flange 66. The air flow existing the air passageways is directed to the flow channel 72 (in a clockwise direction as shown in FIG. 5) towards the multiple slits or vents 74 into, for example, the atmosphere. The air flow is confined within the flow channel 72 with the second cover 36 installed, and thus the debris carried by the air flow may be absorbed or filtered by the one or more absorbent or filtering components 88 that are disposed along at least a part of the flow channel 72 in these embodiments. In the illustrated exemplary rotatory device 10, the air flow is confined by the second cover 36, the second base 60, the inner flange 66, the outer flange 68, and the impeller assembly 70 (due to pressure differential across the impeller assembly 70).

FIG. 6 illustrates that the first cover 34 includes the second base 60, and that the second base 60 includes the second opening 58 which accommodates at least a part of the impeller cover 76 of the impeller assembly 70 in some embodiments. FIG. 6 further illustrates that the sidewall 62 that extends or extrudes from the second base 60 along the axial direction of the shaft 12 in the illustrated embodiments. When the illustrated first cover 34 is installed on the exemplary rotatory device 10, the sidewall 62 extends or extrudes along the axial direction of the shaft 12 towards the rotor 14. The second cover 36 will be attached to the first cover 34 by using, for example, fasteners 64 (shown in FIG. 1) to conceal the internal components.

In the illustrated embodiments, fasteners 64 are also used to secure the first cover 34 and the end cap base 32. Referring back to FIG. 2, the impeller assembly 70 may include an impeller cover 76, a base 78, and multiple blades 80 that are disposed in a circumferential direction with respect to the shaft 12 between the impeller cover 76 and the base 78 (see FIG. 1). In some embodiments, the impeller cover 76 may include a flat portion (e.g., 804B in FIG. 8B) and a curved portion (e.g., 802B in FIG. 8B). The impeller cover 76 may include an intake 82 to allow air to enter the impeller assembly 70 in some of the illustrated embodiments. Each pair of immediately neighboring blades 80 define an air passageway (e.g., 808B in FIG. 8B) which allows pressurized air flow to exit the impeller assembly 70. The base 78 may be fixedly attached to the shaft 12 of the exemplary rotatory device 10 such that the multiple blades 80 may rotate or spin with the rotation or spinning of the shaft 12 in some embodiments.

In some embodiments illustrated in FIG. 2, the bearing seat 44 on the second cover 36 may extend into the intake 82 as shown in FIG. 2. In this illustrated example, a portion of the curved portion (e.g., 802B shown in FIG. 8B) defining the intake 82 in FIG. 2 may extend into the space defined by sidewall 42. In the exemplary rotatory device 10 illustrated in FIG. 2, air may enter the exemplary rotatory device 10 through the one or more openings 84 on the base frame 24 and flow through the area 86 confined by the cylindrical sidewall 42 and the external surfaces of the bearing seat 44 to enter the impeller assembly 70. The pressurized air may exit the impeller assembly 70 via the air passageways (e.g., 808B in FIG. 8B), enter the flow channel 72, and eventually exit the exemplary rotatory device 10 via the one or more slits or vents 74 (see, e.g., FIG. 5 for details).

Figure 8A:
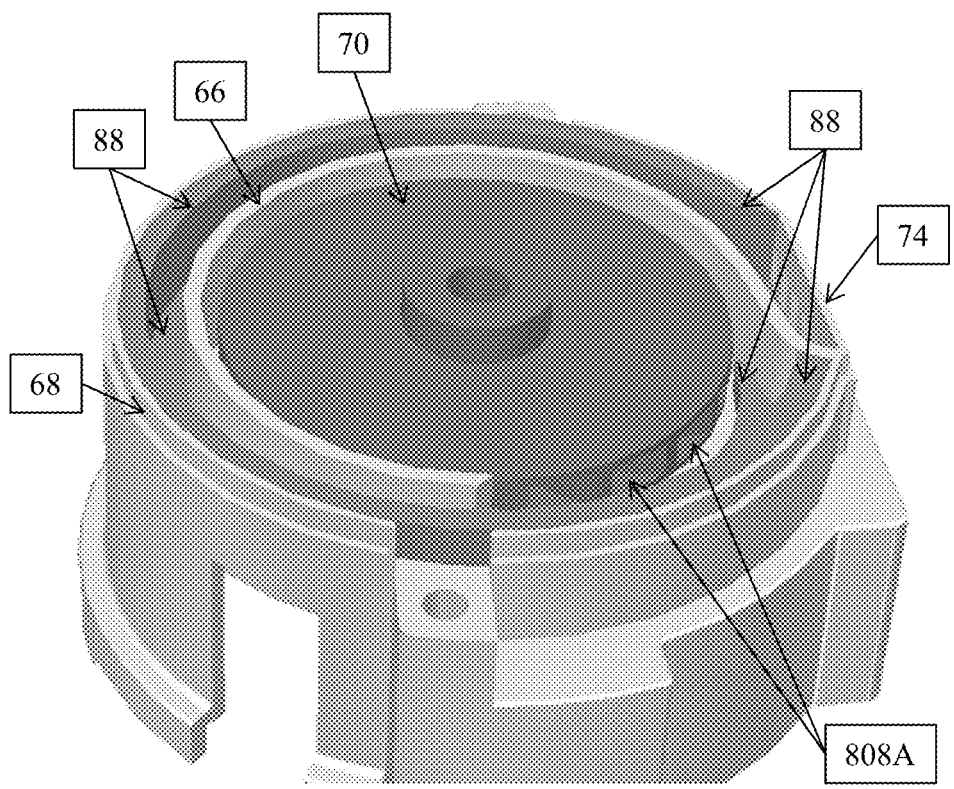
FIG. 8A illustrates a perspective view of the correlation among the impeller assembly, the flow channel, and the absorbent or filter material of an exemplary rotatory device in some embodiments.
Figure 8B:
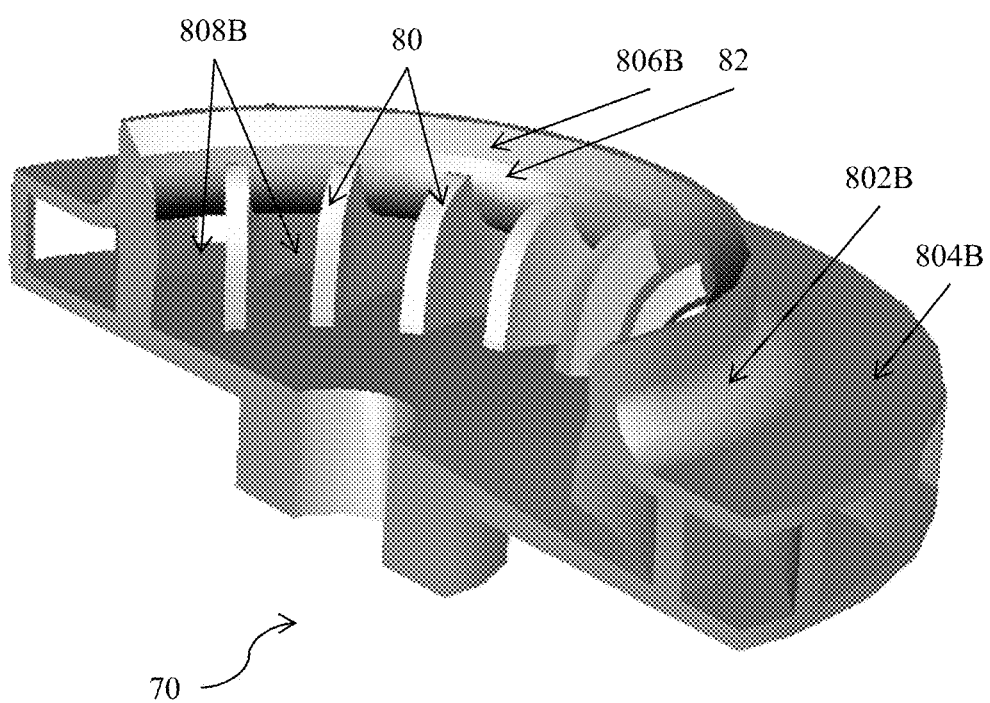
FIG. 8B illustrates an exemplary configuration of an impeller assembly in some embodiments.

FIG. 8A illustrates a perspective view of the correlation among the impeller assembly 70, the flow channel, and the absorbent or filter material 88 of an exemplary rotatory device in some embodiments. More specifically, FIG. 8A shows that the flow channel is defined by the inner flange 66 and the outer flange 68. FIG. 8A further illustrates that the flow channel communicates with the air passageways 808A of the impeller assembly 70. FIG. 8A further illustrates that one or more absorbent or filtering components 88 may also be disposed along at least a part of the flow channel. During operation of the exemplary rotatory device 10, the impeller assembly 70 rotates or spins and drives the air out of the air passageways 808A into the flow channel overlaid with the one or more absorbent or filtering components 88. The air flows in a clockwise direction along the flow channel and exits the flow channel via multiple slits or vents 74, while the debris carried in the air flow may be absorbed or filtered by the one or more absorbent or filtering components 88.

FIG. 8B illustrates an exemplary configuration of an impeller assembly 70 in some embodiments. In this exemplary implementation, impeller assembly 70 includes multiple vanes or blades 80 (hereinafter blades collectively) of various sizes or shapes, a bottom cover or plate 78, and a top cover or plate 76 including one or more intakes or inlets 82 in some embodiments. In some of these embodiments, the top cover 76 includes a flat portion 804B and a curved portion 802B that defines an opening 806B which serves as an inlet or intake 82 for the impeller 70. The multiple blades 80 are arranged in a circumferential direction between the bottom cover 78 and the top cover 76 with respect to the axis of rotation of the impeller assembly 70 and form multiple air passageways 808B between two adjacent blades.

During operation, the air flowing into the impeller assembly 70 from the intake 82 is pressurized due to the geometric profile of the multiple blades 80 and their rotation or spinning and exits the impeller assembly 70 from the multiple passageways 808B. The bottom cover 78 of the impeller assembly 70 may be fixedly attached to the shaft 12 of an exemplary rotatory device (e.g., reference character 10) such that the multiple blades 80 of the exemplary impeller assembly 70 may spin or rotate around the axis of rotation of the shaft 12 in some embodiments. In this exemplary implementation, the bearing seat 44 of the end cap base 32 may be disposed in the intake 82, and the intake 82 may extend into the interior space defined by the sidewall 42 as illustrated in FIG. 2.

In this exemplary implementation, the air flow may enter the exemplary rotatory device 10 through one or more openings 84 on the base frame 24 and may, under the operation of the impeller assembly 70, flow through the channel or passageway 86 between the interior surface of the sidewall 42 and the exterior surface of the bearing seat 44 to enter the impeller assembly 70. The air flow may thus be pressurized due to the operation of the impeller assembly 70 to exit from the multiple passageways 808B to flow into the flow channel 72 defined by the inner flange 66 and the outer flange 68 of the first cover 34 and eventually exit the exemplary rotatory device 10 through the one or more vents or slits 74. In this exemplary implementation, the air flow may thus, with the aid of the impeller assembly 70, dissipate the heat generated during the operation of the rotatory device 10.

In some of these embodiments, the rotatory device 10 may include one or more absorbent or filtering components 88 to absorb or trap the debris from the wear and tear of the brushes during the operation of the rotatory device. In some of these embodiments, the one or more absorbent or filtering components 88 may be disposed in such a manner that the air flow existing the impeller assembly 70 flows through substantially confined channels or passageways at least a part of which include the absorbent or filtering components 88 such that the debris of the brushes may be trapped or absorbed in the absorbent or filtering components 88. It shall be noted that various flow passageways described herein may not necessarily be fully concealed due to the manufacturing tolerances or design slacks for installation or due to normal wear and tear of various components in an exemplary rotatory device, although such flow passageways or at least a part thereof may be designed to be fully concealed in order to better contain the debris of the brushes.

Figure 8C:
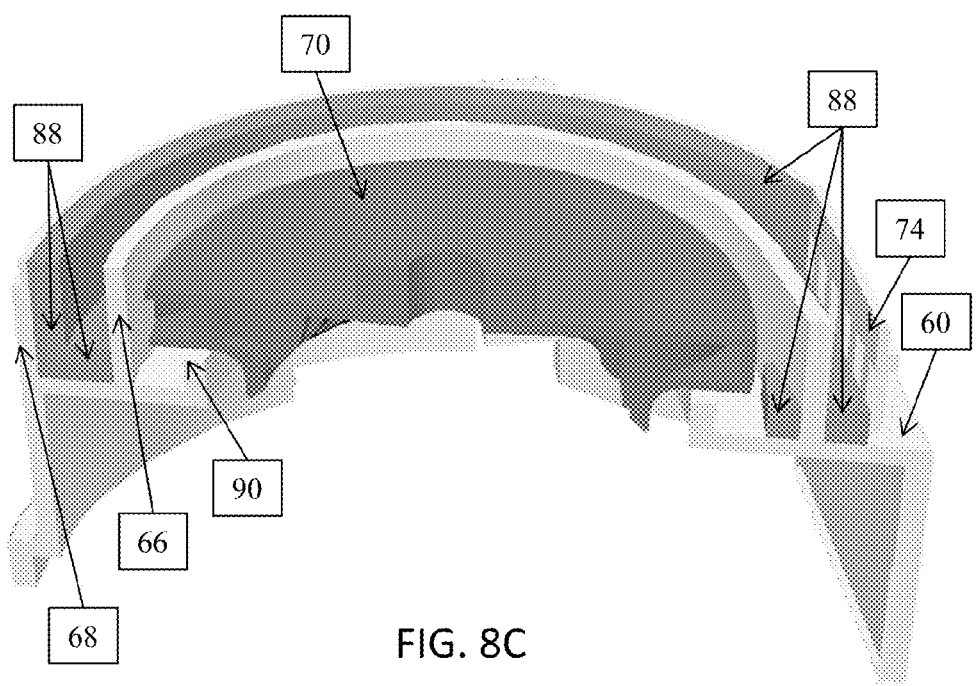
FIG. 8C illustrates a cross-sectional view of the exemplary rotatory device illustrated in FIG. 8A in some embodiments.

In addition, conventional rotatory devices seldom, if ever, intend to trap or filter such debris from the brushes, and thus the flow passageways of the improved rotatory device may still present an improvement over conventional approach even if one of the flow passageways has an opening communicating with the open atmosphere. Therefore, one of ordinary skill in the art will clearly appreciate and understand what a "substantially confined channel" or a "substantially confined passageway" may constitute. As illustrated in FIG. 8C, the air flow may exist the multiple air passageways 808B and enter the flow channel 72 defined by the inner flange 66 and the outer flange 68 and exist from the multiple vents or slits 74.

The air flow may carry with it debris of the brushes due to the interaction between the brushes and the commutation device (e.g., a commutator of a motor) of the rotatory device; and at least a part of the debris may be trapped or filtered by the one or more absorbent or filtering components 88 that overlay, for example, at least a portion of the interior wall of the inner flange 66 and at least a portion of the bottom of the flow channel 72. In this manner, the debris of the brushes may be effectively contained so as to reduce or eliminate contamination due to expelling the debris of the brushes outside the containment of the rotatory device. Another advantage of the exemplary rotatory device is that, with the aid of the impeller assembly 70, the one or more absorbent or filtering components 88, or various air flow passageways, the air flow (e.g., air flow entering the rotatory device through the one or more openings 84) carries the debris from the interaction between the brushes 52 and the commutation device 16 away from the electrical or electronic components (e.g., the electrical or electronic components 54 in FIG. 3) so as to reduce or even eliminate possible short in these electrical or electronic components caused by the debris of the brushes 52 or the commutation device 16 landing on the electrical or electronic components 54. In some embodiments, the one or more absorbent or filtering components 88 may include fireproof foam.

Referring back to FIG. 6, the first cover 34 includes a second base 60 that further defines a second opening 58. The first cover 34 also includes a sidewall portion 90 that extrudes along or is attached to the periphery of the second opening 58 in a direction that leads away from the rotor core 14 in some embodiments illustrated in FIG. 8C. The first cover 34 may also include one or more sidewall portions 62 that form an integral part of or is separately attached to the periphery portion of the base 60 in the axial direction of the shaft 12 in an assembled rotatory device such as the one illustrated in FIG. 1. In some of these embodiments, the sidewall portion 90 and the sidewall 42 of the end cap base 32 (see FIG. 2) may be configured in such a way that the space between the sidewall portion 90 and the sidewall 42 of the end cap base 32 is reduced, minimized, or even eliminated such as in the case of interference fit.

In addition or in the alternative, one or more chambers formed by multiple partitioning walls 92 may be attached to or integrally formed on the exterior surface of the sidewall 42 of the end cap base 32 to accommodate various electrical or electronic components, where each partitioning wall of the multiple partitioning walls 92 may be further attached to, with or without intervening part(s) therebetween, the interior surface of the one or more sidewall portions 62 of the first cover 34 in some embodiments. In these embodiments, the multiple partitioning walls 92 and the one or more sidewall portions 62 may be designed or configured in such a way as to reduce or minimize the spacing between at least the outside partitioning walls 92 and the corresponding portions of the one or more sidewall portions 62 to further protect the electrical or electronic components (e.g., the electrical or electronic components 54 in FIG. 3) housed therein from, for example, the debris generated by the interaction between the brushes 52 and the commutation device 16.

For example, in the exemplary implementation illustrated in FIG. 2, the multiple partitioning walls 92 and the one or more sidewall portions 62 may be designed or configured in such a way as to preventing the aforementioned debris from migrating through the space between the sidewall portion 90 and the sidewall 42 into the space between the sidewall 42 and the one or more sidewall portions 62 of the first cover 34 and continue to reach the area near the end cap base 32 (e.g., the area between sidewall 42 of the end cap base 32 and the one or more sidewall portions 62 of the first cover) where the electrical or electronic components 54 are disposed. Whether or not a space is permitted between at least the outside partitioning walls 92 and the corresponding portions of the one or more sidewall portions 62 or the amount of space between at least the outside partitioning walls 92 and the corresponding portions of the one or more sidewall portions 62 may be determined based at least in part upon the types of electrical or electronic components housed in the one or more chambers or how sensitive the electrical or electronic components housed in the one or more chambers are.

For example, well protected or isolated components or components with sufficient spacing in between may not be as sensitive to such debris or contaminants as those that are insufficiently protected or isolated or those with small spacing in between and thus may allow for larger spacing between the outside partitioning walls 92 and the corresponding portions of the one or more sidewall portions 62. In some embodiments where the electrical or electronic components 54 are housed in one or more chambers formed by the multiple partitioning walls 92, the electrical or electronic components 54 are still protected against such contaminants or debris even if some debris eventually finds its way through various slacks or gaps between various components described herein. In these embodiments, the debris caused by the interaction between the brushes 52 and the commutation device 16 may be substantially reduced by some or all of multiple stages of preventive measures including substantially enclosed containment of the electrical or electronic components, the reduction or elimination of the migration paths for the contaminants or debris, as well as the containment of the space in which commutation of the rotatory device occurs.

FIG. 8C illustrates a cross-sectional view of a portion of the exemplary rotatory device illustrated in FIG. 8A in some embodiments. More specifically, FIG. 8C illustrates that the exemplary rotatory device may include a first cover (e.g., the first cover 34 in FIGS. 1 and 5-6) that includes a second base 60 and the sidewall portion 90. The first cover illustrated in FIG. 8C may also include an inner flange 66 and an outer flange 68 that jointly define a flow channel to guide the air flow entering the impeller assembly 70 from the intake (e.g., the intake 82 in FIG. 2) and existing the impeller assembly 70 via the multiple air passageways defined by the multiple blades (e.g., 808A in FIG. 8A and 808B in FIG. 8B).

FIG. 8C also illustrates that the inclusion of the absorbent or filtering components 88 along the internal surface of the outer flange 68 and also atop the second base 60 between the inner flange 66 and the outer flange 68 in the flow channel in the illustrated embodiments. It shall be noted that although the exemplary rotatory device 10 does not include the absorbent or filter component 88 along the external surface of the inner flange 66 in the illustrated embodiments, the exemplary rotatory device 10 may nonetheless include the absorbent or filter component 88 on any portion of any of the surfaces defining the flow channel in other embodiments.

As previously described, during operation of the exemplary rotatory device 10, the impeller assembly 70 rotates or spins either by its own power source or together with the shaft 12 and drives the air out of the air passageways between two immediately neighboring blades 80 of the impeller assembly 70 into the flow channel a part of which may be overlaid with the one or more absorbent or filtering components 88. The air flows within and exits the flow channel the flow channel via multiple slits or vents 74, while the debris carried in the air flow may be absorbed or filtered by the one or more absorbent or filtering components 88 in order to reduce or eliminate the possibility of such debris landing or depositing on one or more other electrical components (e.g., electrical or electronic components 54 in FIG. 3) or to reduce or eliminate the possibility of such debris being expelled out of the exemplary rotatory device and into the atmosphere.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A brushed rotatory device, comprising:
    a rotor including a shaft, a rotor core and a commutator attached to the shaft;
    a housing assembly surrounding the rotor;
    an impeller assembly mechanically coupled to the shaft of the rotor and adjacent to the commutator and remote from the rotor core;
    an end cap assembly attached to a first end of the housing assembly adjacent the commutator and including a base having at least one opening formed therein, a sidewall extending from the base around a periphery of the at least one opening in an axial direction of the shaft of the rotor and surrounding the commutator of the rotor, and a plurality of brush holders attached to the base; and
    a plurality of brushes disposed in the plurality of brush holders of the end cap assembly and in sliding contact with the commutator of the rotor; and
    wherein the end cap assembly further comprises a flow channel having a first end communicating with a plurality of air passageways of the impeller assembly, and the flow channel is arranged downstream of the impeller assembly along a circumferential direction of the end cap assembly.

2. The brushed rotatory device according to claim 1, wherein:
    the impeller assembly comprises a plurality of blades defining the plurality of air passageways.

3. The brushed rotatory device according to claim 2, further comprising an absorbent or filtering component disposed along at least a part of the flow channel of the end cap assembly.

4. The brushed rotatory device according to claim 3, wherein the end cap assembly further comprises one or more exhaust ports disposed at a second end of the flow channel and downstream over at least a portion of the absorbent or filtering component.

5. The brushed rotatory device according to claim 2, wherein plurality of air passageways of the impeller assembly fluidly communicate with an area surrounding the commutator inside the housing assembly only through the at least one opening in the base of the end cap assembly.

6. The brushed rotatory device according to claim 2, further comprising an end cap cover attached to a first end of the end cap assembly and including a flat portion in contact with two sidewalls on both sides of the flow channel.

7. The brushed rotatory device according to claim 1, further comprising:
    a first bearing supporting the shaft of the rotor; and
    a first bearing seat disposed on the end cap assembly, accommodating the first bearing, and including a seat flange extending along the axial direction of the shaft toward the commutator.

8. The brushed rotatory device according to claim 1, the impeller assembly comprising:
    an intake disposed on one end of the impeller assembly adjacent to the commutator of the rotor; and
    a plurality of blades defining a plurality of air passageways with each air passageway between two immediately neighboring blades of the plurality of blades.

9. The brushed rotatory device according to claim 1, further comprising:
    a chamber including a chamber body having one or more partitions attached to the housing assembly; and
    at least one electrical component electrically connected to the plurality of brushes and disposed inside at least some of the one or more partitions of the chamber.

10. The brushed rotatory device according to claim 9, wherein the chamber is disposed on an internal side of the housing assembly.

11. The brushed rotatory device according to claim 1, wherein:
    the end cap assembly further comprises a flange;
    the flange of the end cap assembly and at least a portion of the impeller assembly define a chamber inside the housing assembly, at least partially surrounding the commutator of the rotor, and having a chamber opening; and
    the impeller assembly includes an intake situated in an opening of the chamber.

12. The brushed rotatory device according to claim 1, further comprising a frame including one or more openings and attached to a second end opposite to the first end of the housing assembly, wherein the one or more openings communicate with an air intake of the impeller assembly inside the housing assembly.

13. The brushed rotatory device according to claim 1, the impeller assembly comprising a centrifugal type impeller and further including:
    a plurality of blades; and
    an impeller cover disposed on one side of the plurality of blades, adjacent to the rotor core of the rotor and having a curved portion forming an air intake for the impeller assembly, wherein at least a portion of the air intake of the impeller cover is disposed in the at least one opening in the base of the end cap assembly.

14. The brushed rotatory device according to claim 1, wherein the flow channel is jointly defined by an inner flange and an outer flange.

15. A method of using a rotatory device, comprising:
    identifying a rotatory device including an end cap removably attached to a housing assembly of the rotatory device on a first end of rotatory device, wherein the housing assembly encloses a commutation area in which a commutator and multiple brushes are disposed;
    preventing debris generated by interactions between the multiple brushes and the commutator from migrating into one or more undesired areas by rotating an impeller assembly to carry the debris with air flow to a flow channel which is arranged downstream of the impeller assembly along a circumferential direction of the end cap assembly;

reducing a noise level of operations of the rotatory device by enclosing the at least a part of the commutation area within the housing assembly; and reducing heat generated by the operations of the rotatory device by guiding air flow past at least some internal components within the housing to the flow channel disposed on the end cap communicating with an exhaust on the end cap.

16. The method claim 15, wherein preventing the debris from migrating into the one or more undesired areas further comprises enclosing at least a part of the commutation area within the housing assembly with a first chamber defined by at least a part of a bearing seat on the end cap.

17. The method claim 16, wherein preventing the debris from migrating into the one or more undesired areas further comprises enclosing at least a part of the first chamber within the housing assembly with a second chamber defined by at least a flange extending from the end cap along an axial direction of a shaft of the rotatory device.

18. The method claim 15, wherein preventing the debris from migrating into the one or more undesired areas further comprises impelling air flow through at least an absorbent or filtering component overlaid on one or more surfaces of a flow channel having a first communicating with multiple air passageways of an impeller assembly and a second end communicating with an exhaust on the end cap.

19. The method claim 15, wherein preventing the debris from migrating into the one or more undesired areas further comprises disposing one or more electrical components in a chamber attached to an external surface of the housing assembly and having one or more partitions.

20. The method claim 15, wherein identifying a rotatory device comprises identifying a high-voltage direct current brushed motor.

* * * * *